(No Model.)
N. E. SMITH.
PIPE COUPLING.
No. 599,267. Patented Feb. 15, 1898.
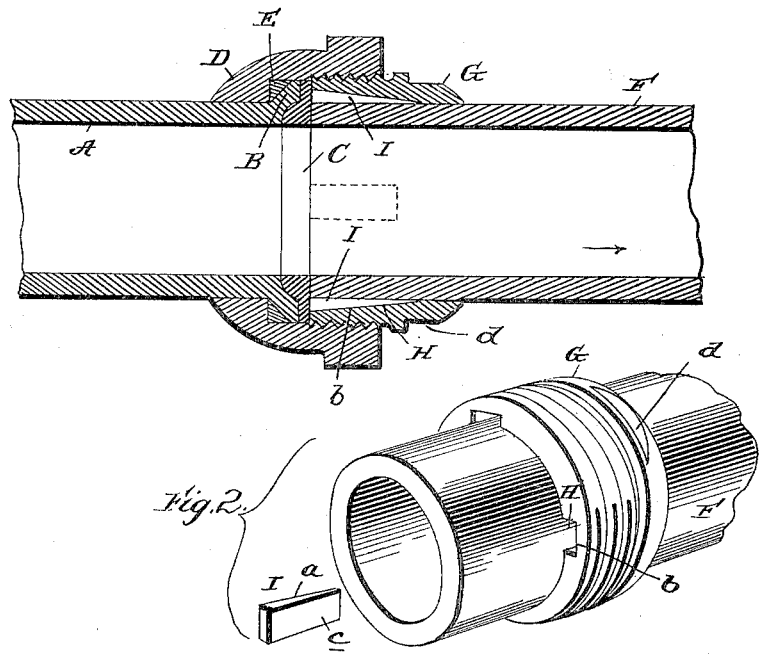
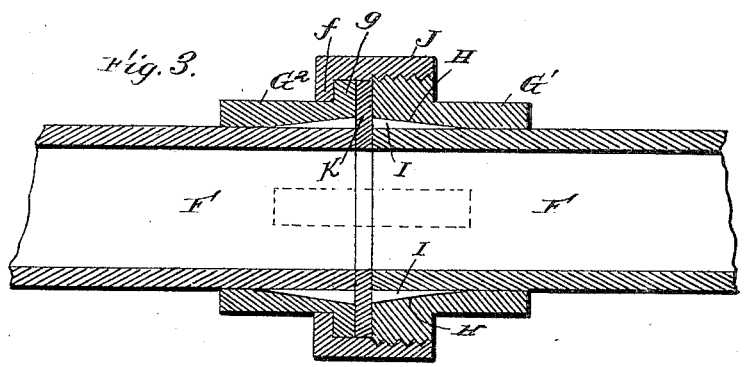
Witnesses:
C. H. Roeder
Jessie G. Croney
Inventor
N. E. Smith
By James J. Sheehy
Attorney

UNITED STATES PATENT OFFICE.

NATHANIEL E. SMITH, OF JERSEY CITY, NEW JERSEY.

PIPE-COUPLING.

SPECIFICATION forming part of Letters Patent No. 599,267, dated February 15, 1898.

Application filed September 18, 1897. Serial No. 652,150. (No model.)

*To all whom it may concern:*

Be it known that I, NATHANIEL E. SMITH, a citizen of the United States, residing at Jersey City, in the county of Hudson and State of New Jersey, have invented certain new and useful Improvements in Pipe-Couplings; and I do declare the following to be a full, clear, and exact description of the invention, such as will enable others skilled in the art to which it appertains to make and use the same.

My invention relates to pipe-couplings, and contemplates the provision of a strong and durable coupling through the medium of which a hard-metal pipe may be readily connected with a soft-metal pipe, or two hard-metal pipes may be connected together without the necessity of forming threads or the like on the hard-metal pipe or pipes.

Other objects and advantages of the invention will be fully understood from the following description and claims when taken in conjunction with the annexed drawings, in which—

Figure 1 is a sectional view illustrating my improved coupling as connecting a hard-metal pipe-section and a soft-metal pipe-section. Fig. 2 is a perspective view illustrating the hard-metal pipe-section, the annular coupling member thereon, and one of the wedges for fixing said member on the hard-metal pipe; and Fig. 3 is a sectional view illustrating a modified form of coupling for connecting two hard-metal pipe-sections.

Referring by letter to said drawings and more particularly to Figs. 1 and 2 thereof, A designates a soft-metal pipe-section which is similar to those disclosed in my application filed June 17, 1897, Serial No. 641,166, being provided at one end with a collar-flange B, designed to receive a soft-metal annulus or button C and be surrounded by a hard-metal thimble or coupling member D, between which and the collar-flange is preferably interposed a hard-metal washer E, as shown.

F designates the hard-metal pipe-section, and G designates the annular coupling member which surrounds and is designed to be fixed to the pipe-section F and is provided with exterior threads, as shown, for the engagement of those of the thimble or coupling member D, as shown in Fig. 1. The said coupling member G is provided in its inner side with three (more or less) longitudinally-disposed grooves H, which are open at the inner end of the said member and are gradually diminished in depth from said end to their inner ends, as best shown in Fig. 1. These grooves H are designed and adapted to receive the hard-metal wedges I, which have their outer sides $a$ inclined in conformity to the bottom walls $b$ of the grooves, while their inner sides $c$ are perpendicular or square to their forward ends, as best shown in Fig. 2. The said wedges I are designed to fix the hard-metal pipe-section F in the coupling member G, so as to effectually prevent the said pipe-section being drawn or moved in the direction indicated by arrow (see Fig. 1) with respect to said coupling member. In effecting such fixture the coupling member G is placed on pipe F and adjusted until its end in which the open ends of the grooves H are formed rests flush with the end of the pipe. The wedges I are then placed in the grooves H, with their sides $a$ contiguous to the bottom walls $b$ of the grooves and their sides $c$ contiguous to the surface of the pipe and are pushed or driven home—that is to say, are forced into the grooves until their outer or large ends rest flush with the end of the coupling member G. This being done it will be seen that any tendency of the pipe-section F to move in the direction indicated by arrow with respect to the coupling member G will only bind the wedges I more securely against the pipe-section and strengthen the fixture of the same to said coupling member. While this is so, if it is desired to remove the coupling member G from the hard-metal pipe-section the same may be accomplished by moving the pipe-section in the direction opposite to that indicated by arrow with respect to the coupling member G. Such movement of the pipe-section will result in a loosening of the wedges I and permit of them being readily removed, after which the coupling member may be moved in either direction off the pipe-section.

In addition to securely holding the pipe-section F against movement in the direction indicated by arrow with respect to the coupling member G the wedges I serve to fix the pipe-section to the coupling member, so that said coupling member and pipe-section may be held against turning through the medium of a wrench applied to the angular portion $d$ of the member when the thimble is turned on said member.

In effecting the coupling shown in Fig. 1 the soft-metal pipe-section is equipped with the devices described, and the coupling member G is fixed on the hard-metal pipe-section in the manner set forth. The member G is then screwed in the coupling member or thimble D until the flush ends of the member G and pipe F bear against the soft-metal button C, when a strong and secure coupling will be formed and one which is perfectly water and gas tight.

In Fig. 3 of the drawings I have shown a modification of my invention as connecting two hard-metal pipe-sections F. In this construction the coupling members $G'$ $G^2$ are fixed on the hard-metal pipe-sections in the same manner that the coupling member G is fixed on the pipe-section F, after which said coupling members are connected by a union J, which is flanged, as indicated by $f$, to engage an exterior projection $g$ of the coupling member $G^2$, and interiorly threaded to engage the exterior threads of the coupling member $G'$, as shown. A suitable washer K, preferably of lead, is interposed between the ends of the pipe-sections and also between the contiguous ends of the coupling members $G'$ $G^2$ to render the coupling water and gas tight. I would have it understood, however, that I do not desire to be confined to the manner shown of connecting the members $G'$ $G^2$ or to the means employed in Fig. 3 for rendering the coupling gas and water tight, as the coupling members may be connected in any suitable manner and any desired packing may be employed.

I would further have it understood that my invention may be used to advantage for fixing a hard-metal annulus on a hard-metal pipe-section when said annulus is to be used for other than coupling purposes, and also that the hard-metal annulus may be fixed on the pipe at an intermediate point of the length thereof as well as at the end.

In virtue of my improvements it will be seen that the labor and expense incident to cutting threads on a hard-metal pipe of large size are dispensed with. It will also be observed that by my improvements a coupling member may be fixed on a hard-metal pipe-section which is so situated as to preclude the formation of threads thereon, and when no means are at hand for holding the pipe-section while the threads are being cut thereon my improvements will obviate the necessity of taking the pipe to the shop.

Having thus described my invention, what I claim is—

1. The combination of a pipe-section, an annulus arranged on said pipe-section and having a longitudinally-disposed groove on its inner side open at one end and gradually diminished in depth from such open end to its opposite end, and a wedge arranged in said groove and having its outer side inclined in conformity to the bottom wall of the groove, substantially as specified.

2. The combination of a hard-metal pipe-section, a hard-metal annulus arranged on said pipe-section and having three (more or less) longitudinally-disposed grooves in its inner side, open at one end and gradually diminished in depth from such open ends to their opposite ends, the hard-metal wedges arranged in said grooves and having their outer sides inclined in conformity to the bottom walls of the grooves, substantially as specified.

3. In a pipe-coupling, the combination of a hard-metal pipe-section, a hard-metal coupling member arranged on said pipe-section and adapted to be connected with a complementary coupling member and having a longitudinally-disposed groove in its inner side open at one end and gradually diminished in depth from such open end to its opposite end, and a hard-metal wedge arranged in said groove and having its outer side inclined in conformity to the bottom wall of the groove, substantially as specified.

4. In a pipe-coupling, the combination of a soft-metal pipe-section having a collar-flange at its end, a soft-metal button seated in the end of the soft-metal pipe and bearing against the flange thereof, an interiorly-threaded thimble surrounding the soft-metal pipe-section, a hard-metal pipe-section, a coupling member arranged on said hard-metal pipe-section and threaded to engage the thimble and having a longitudinally-disposed groove in its inner side open at one end and gradually diminished in depth from such open end to its opposite end, and a hard-metal wedge arranged in said groove and having its outer side inclined in conformity to the bottom wall of the groove, substantially as specified.

5. In a pipe-coupling, the combination of two pipe-sections, a soft-metal annulus interposed between the contiguous ends of said pipe-sections, a coupling member suitably secured on one pipe-section, a second coupling member arranged on the other pipe-section and suitably connected with the first-named coupling member and having a longitudinally-disposed groove in its inner side, open at one end and gradually diminished in depth from such open end to its opposite end, and a hard-metal wedge arranged in said groove and having its outer side inclined in conformity to the bottom wall of the groove, substantially as specified.

In testimony whereof I affix my signature in presence of two witnesses.

NATHANIEL E. SMITH.

Witnesses:
ARTHUR A. SMITH,
ALIDA LAPPIN.